United States Patent [19]

Takiyasu et al.

[11] Patent Number: 5,113,392
[45] Date of Patent: May 12, 1992

[54] COMMUNICATION APPARATUS FOR REASSEMBLING PACKETS RECEIVED FROM NETWORK INTO MESSAGE

[75] Inventors: Yoshihiro Takiyasu, Higashimurayama; Mitsuhiro Yamaga, Kawasaki; Kazunori Nakamura, Hadano; Eiichi Amada, Tokyo; Hidehiko Jusa, Higashimurayama; Naoya Kobayashi, Hachiuji; Osamu Takada, Sagamihara; Satoru Hirayama, Yokohama; Tatsuhito Iiyama, Hadano, all of Japan

[73] Assignees: Hitachi, Ltd.; Hitachi Microcomputer Engineering Ltd., both of Tokyo, Japan

[21] Appl. No.: 539,961

[22] Filed: Jun. 18, 1990

[30] Foreign Application Priority Data

Jun. 19, 1989 [JP] Japan .................................. 1-154599

[51] Int. Cl.⁵ .............................................. H04J 3/26
[52] U.S. Cl. .................................. 370/85.15; 370/94.1
[58] Field of Search ............... 370/60, 61, 94.1, 99, 370/85.15

[56] References Cited

U.S. PATENT DOCUMENTS 5,016,248 5/1991 Kudoh .............................. 370/94.1

OTHER PUBLICATIONS

IEEE, Journal on Selected Areas, vol. SAC-3, No. 6, 1985, "A Metropolitan Area Network", Daniel Sze, pp. 815-824.

"B486 MAC Bridge in 410 M6ps Multimedia Highway", K. Shikata et al., Drafts B-486 for a Spring National Meeting, 1989, of the Institute of Electronics, Information, and Communications Engineers of Japan.

Primary Examiner—Douglas W. Olms
Assistant Examiner—Melvin Marcelo
Attorney, Agent, or Firm—Antonelli, Terry, Stout & Kraus

[57] ABSTRACT

In a network having a plurality of node apparatus connected to a transmission line, each node apparatus segmenting a transmission message into information blocks of a predetermined length and transmitting them to the transmission line in the form of a fixed length packet (cell) having a source address, each node apparatus sequentially stores packets having different source addresses in vacant memory blocks of a buffer memory. There is written in each memory block the packet data as well as a next address pointer indicating a memory block in which the next received packet having the same source address is stored. When a packet containing the last information block of a message is received, stored in a read address queue is the address indicating the memory block which stores the first information block of the same packet. Reading the first block of a message from the buffer memory is executed in accordance with an address read from the read address queue, and reading the following blocks is executed in accordance with the next address pointer. Read/write of the buffer memory is alternately executed in units of memory block.

8 Claims, 9 Drawing Sheets

COMMUNICATION APPARATUS FOR REASSEMBLING PACKETS RECEIVED FROM NETWORK INTO MESSAGE

BACKGROUND OF THE INVENTION

1. Field of the Invention

This invention relates to a communication apparatus used in transmission systems wherein bursty information (or messages) such as LAN frames and packet frames are segmented into packets of a single fixed length or multiple fixed lengths, and a plurality of packets are multiplexed and transmitted to a transmission line. This invention particularly relates to the apparatus structure for reassembling received packets into the original transmitted information and to the reassembling method.

2. Description of the Related Art

A slotted ring LAN such as described in IEEE, Journal on Selected Areas, Vol. SAC-3, No. 6, 1985, pp. 815 to 824 essentially requires the technique that information or message from a terminal station is segmented at a LAN node into data blocks of a single fixed length or multiple fixed lengths, and a fixed length packet (hereinafter called a cell where applicable) including the data block is sent to a transmission line, whereas cells received from the LAN transmission line are reassembled to the original information or message. The slotted ring LAN allows each node connected thereto to freely use a vacent slot, thereby realizing communication between a plurality of nodes at the same time. Each LAN node receives its own cells from the LAN transmission line, and temporarily buffers them correspondingly with source addresses added to cells. When the last cell of a message is received, the buffered last cell and other cells from the same source node are reassembled into the original message which is in turn sent to a terminal station or sub-LAN accessible by the node.

In order to ensure reliable and correct communications even under the condition that cells sent from different source nodes are concentrated to a single LAN node, it is necessary for each node to have a buffer memory whose capacity is sufficient for the temporary storage of all received cells until the reassemble operation is completed. For example, assuming that each node in a LAN having n nodes transmits messages received from its terminal station one message at a time to LAN, the maximum number of messages received at a node at a time is $(n-1)$. Assuming further that the maximum length of a message sent from a terminal station is M, then the memory capacity of at least $(n-1) \times M$ becomes necessary for receiving all the packets of maximum length messages sent from all the other nodes at the same time. In such a case, consider the case where there is used a scheme that each time the first packet of each message is received, a buffer memory area of length M is reserved, and that succeeding packets constituting the same message are stored in the buffer memory area reserved for that message. This buffer storage memory area cannot be used as the area for storing packets of the succeeding messages even after the last packet of the preceding message is received, until the read processing (reassemble) of all the received packets from the buffer memory area is completed. Accordingly, with the scheme for allocating the maximum length buffer memory area correspondingly for each message, it is necessary to provide a memory capacity near $(n-1) \times M \times 2$ in order to store all packets to be received while the read operation for the previously received packets is executed.

In the Drafts B-486 for a Spring national meeting of the Institute of Electronics, Information, and Communications Engineers of Japan, 1989, there has been proposed a data communications system for a slotted ring LAN, which uses an access method by a token. According to this data communications system, each frame among multiple frames on the LAN transmission line is assigned a token and data transfer area, and only the node which seized a token is allowed to transfer the data to the data transfer area. Each node is assigned beforehand a unique token number, and a source node is not allowed to communicate unless it seizes a specific token corresponding to a destination node. Accordingly, a plurality of messages will not arrive at each node at the same time, thereby making small the capacity of a buffer memory for use in reassembling a message. With this method, however, each node is not allowed to transmit data unless it seizes a token corresponding to a destination node. Therefore, as a long message is transmitted from a node, other nodes are required to wait for a long time for data transmission. It is therefore considered that the above method is not most suited for multi-media communications where general data and other data requiring real time transmission such as voices and images are transmitted to the same LAN.

SUMMARY OR THE INVENTION

It is an object of the present invention to provide a communication apparatus capable of efficiently using a buffer memory for storing received packets and reassembling them without discarding any received packets because of insufficient memory area.

It is another object of the present invention to provide a reassemble apparatus for reassembling received cells into messages, suitable for use with a network where a source communication apparatus transmits a message to a destination communication apparatus in the form of fixed length packets (cells), whereas the destination communication apparatus sequentially receives a plurality of cells from different source communication apparatus and reassembles them into messages.

In order to achieve the above objects of the present invention, each communication apparatus (hereinafter simply called a node) stores, in a vacant memory block within a buffer memory, all data of each received cell or a part of the received cell which part is a field including a message information block (hereinafter called message information field). A next address pointer is stored in the memory block, the next address pointer pointing the address of a memory block stored in which are the data of a cell having the next information block of the same message in the message information field. The address indicating a vacant memory block within the buffer memory is stored beforehand, for example, in a first memory of a FIFO type. If a received cell is a cell containing the first information block of a message (FIRST cell) or a cell containing all information of a message (SINGLE cell), the cell data are stored in a memory block identified by the address read from the first memory. It is not necessary to write a next address pointer in a memory block which stores the data of a SINGLE cell having no succeeding cell. Another address read from the first memory is written as the next address pointer in the memory block storing the FIRST cell data at the memory area following the cell data.

According to the present invention, there are also provided second to fourth memories. The second memory stores therein addresses used as next address pointers, correspondingly with each message. The third memory stores therein addresses indicating memory blocks which store FIRST cell data, correspondingly with each message. The fourth memory stores therein addresses indicating memory blocks which store the first cell data of messages which are allowed to be reassembled. The correspondence between cells and messages can be judged from a source node address contained in each cell. If a received cell is a cell containing the last information block of a message (LAST cell) or a cell containing an intermediate information block between the first and last information blocks (LAST cell), the cell data are stored in a memory block identified by an address pointer read from the second memory. If a received cell is a NEXT cell, in the similar manner as the FIRST cell, an address read from the first memory is stored as the next address pointer in the memory block and in the second memory. If a received cell is a LAST cell, in the similar manner as the FIRST cell, it is not necessary to store the next address pointer in the memory block and in the second memory. If a LAST cell is received, the address indicating the memory block storing the cell data of the corresponding FIRST cell is transferred from the third memory to the fourth memory.

By using the above-described next address pointer, a plurality of memory blocks which store information blocks constituting a message are chained to each other by next address pointers on the buffer memory.

According to the present invention, there are alternately provided a write cycle for writing received cell data into a buffer memory and a read cycle for reading cell data from the buffer memory. If an address is present in the fourth memory, the cell data and next address pointer in a memory block within the buffer memory are read in accordance with an address read from the first memory. If the read-out cell data are for the SINGLE or LAST cell, an access to the buffer memory at the next read cycle is executed in accordance with an address read again from the fourth memory. If the read-out cell data from the buffer memory are for the FIRST or NEXT cell, the memory block indicated by the next address pointer read from the buffer memory is used for reading the cell data at the next read cycle. During each of the read cycles, the memory block from which the cell data have been read is released for writing data of another cell, while storing the address indicating this memory block in the first memory.

According to the present invention, prior to the completion of reading all cell data constituting a message, a memory block whose read operation has been completed is released in units of cell, thereby allowing efficient use of memory areas. For example, assuming that each node transmits messages received from its terminal station or sub-LAN one message at a time, it is sufficient for a destination node to prepare a memory capacity, per one source node, corresponding to a maximum length message (including necessary next address pointers). The reason is that in parallel with reception of cells of the next message transmitted from a source node, cell data of the preceding message are read from the buffer memory so that vacant memory blocks are produced one after another and the cell data of the next message can be stored in vacant memory blocks.

The foregoing and other objects, advantages, manner of operation and novel features of the present invention will be understood from the following detailed description when read in connection with the accompanying drawings.

DESCRIPTION OF THE PREFERRED EMBODIMENTS

Figure 1:
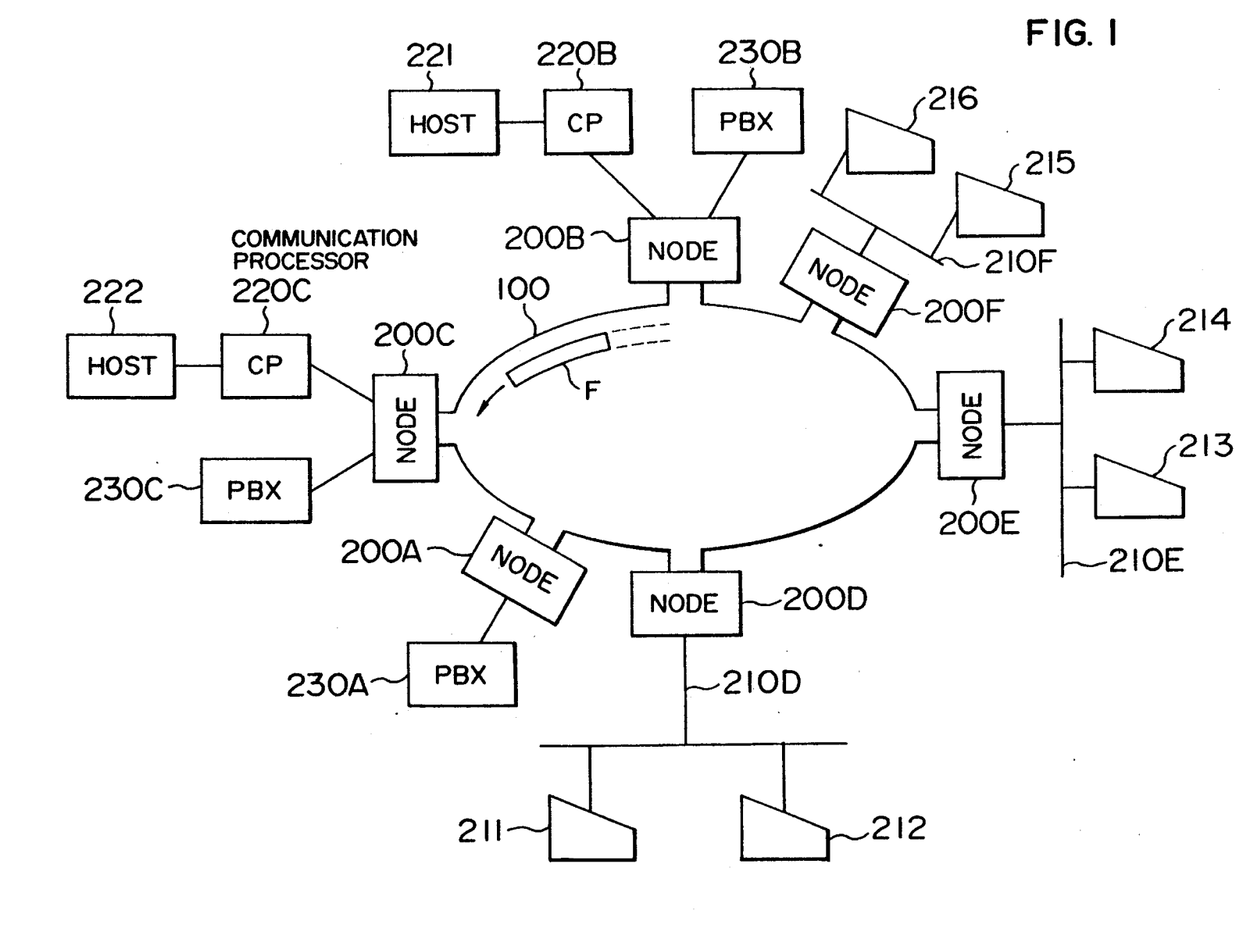
FIG. 1 shows an example of network systems applying the present invention.

FIG. 1 shows an example of data transmission systems applying the present invention. A main LAN is constructed of a transmission line 100 and a plurality of nodes (communication apparatus) 200A to 200F connected in a ring form along the transmission line. A plurality of frames F circulate in LAN, and nodes communicate with each other by using frames F, the number of frames being determined by the ring latency/125 $\mu$sec. In this embodiment, it is assumed that one node, e.g., node 200A serves as a master node, and other nodes 200B to 200F serve as a slave node. Each node has one or more connection ports through which connected are external devices such as a sub-LAN 210 (210D to 210F), communication processor 220, and private branch exchange PBX 230 (230A to 230C). Terminal stations 211 to 216 are connected to sub-LANs 210D to 210F. For the data communication of a terminal station connected to a sub-LAN with a terminal station of another sub-LAN or with a host computer connected to a communication processor 200, data are transferred using a packet switch service which packet-multiplexes communication data on the transmission line 100. Each PBX 230 has telephone sets and low speed data terminals, and the data (voice information) transmitted from these apparatus are time-division multiplexed on the transmission line 100 by a circuit switch service.

Figure 2:
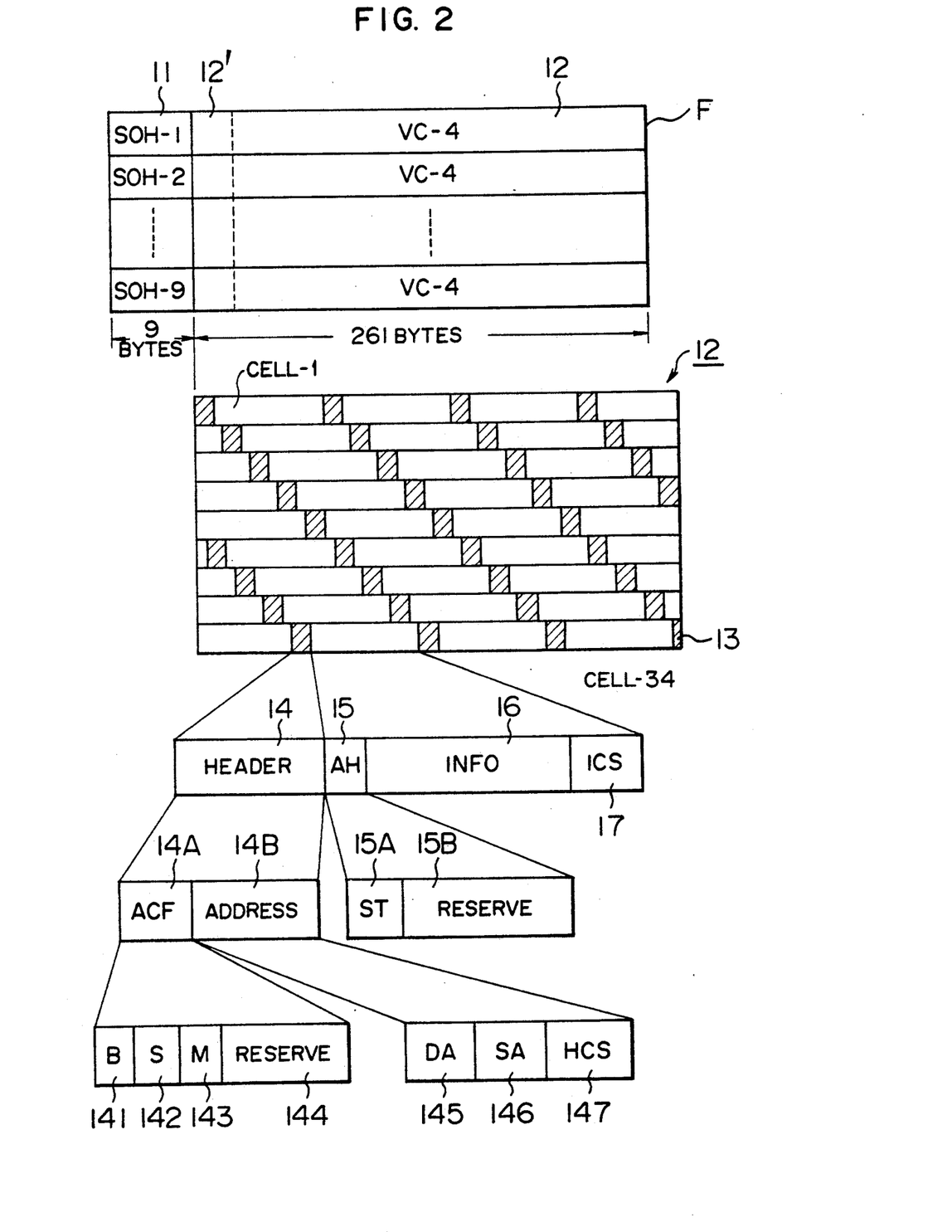
FIG. 2 illustrates examples of formats of a communication frame and cell (fixed length packet) on a main LAN transmission line of the network system shown in FIG. 1.

In this embodiment, the information transfer rate on the transmission line 100 of the main LAN has been designed as 155.52×n Mbps (n is an even number) which is approximately a common multiple between the standard transfer rate 155.52 Mbps of a public network in conformity with CCITT (Consultative Committee in International Telegraphy and Telephony) and the transfer rate of LAN in conformity with ANSI (Americal National Standards Institute). For example, the transfer rate is set at 155.52 Mbps×16 by multiplexing sixteen SONET (Synchronous Optical Net-Work) frames F each having 270 bytes×9 columns as shown in FIG. 2 every 125 μsec on the one-byte unit basis. In this case, sixteen logical transmission lines are formed on a single physical transmission line 100 so that one SONET frame F is transferred on each logical transmission line every 125 μsec.

Each column of SONET frame F is constructed of a section overhead (SOH) field 11 of 9 bytes and a virtual container (VC-4) field 12 of 261 bytes. The SOH field 11 includes inter-node communication control information such as a frame synchronization pattern, 155.52 Mbps unit identifier (SONET frame ID), and AU pointer indicating the top address of a container where the information transmitted by a node is actually located. According to the format of SONET described in CCITT Recommendation Draft G.707 to 709, there is assigned to the VC-4 field 12 a path overhead (POH) field 12' of one byte for storing control information used by a public network multiplexer. In this embodiment, the whole area of the VC-4 field inclusive of the POH field is used as the area for the transfer of a fixed length packet (cell).

In this embodiment, each cell has a 69 byte length, and the total of thirty four cells (CELL-1 to CELL-34) is allocated within the VC-4 field of one SONET frame, the remaining field 13 being an invalid region. Each cell is constructed of a cell header 14 of 5 bytes and an information field of 64 bytes. The information field is constructed of a two byte adaptation header (AH) field 15, 60 byte user information (INFO) field 16, and 2 byte information check sequence (ICS) field 17. The length of the INFO field 16 varies with the length of a cell.

Each header 14 is constructed of, e.g., a one byte access control field (ACF) 14A and 4 byte address field 14B. The most significant bit (B) 141 of ACF 14A indicates if the cell is being used (B="1") or not (B="0"). The next two bits (S) 142 indicate the type of information written in the information field. For example, S="00" indicates the information requesting time division multiplexing, and S="10" indicates the information requesting packet multiplexing. Each node transfers information by using a generally used access scheme for a slotted ring wherein an information block is first transferred by using a non-use cell with its B bit indicating "0", and when the cell with its B bit having been changed to "1" circulates the ring transmission line 100 once and is returned to the node, the B bit is changed to "0".

The fourth bit (M) 143 of ACF 14A is a monitor bit used for detecting that a cell in a use state abnormally circulates the ring transmission line. The remaining bits 144 in ACF serves as a reserved field. The master node 200A changes the M bit to "1" for all cells with B bit "1" circulating on the transmission line, whereas each source node changes the M bit to "0" when the used cell circulates the ring once and returns back. So long as the master node and the source node operate normally, all cells passing the master node should have bit B=0, and a cell with M=0 should return to the source node. Upon reception of a cell with (B, M)=(1, 1), the master node judges an occurrence of an abnormal state of a source node, and resets B and M bits to "0". On the other hand, a source node judges an occurrence of abnormal operation of the master node when it receives the used cell as having a state of (B, M)=(1, 0). In this case, the source node monitors the time duration of the abnormal operation of the master node, and if it exceeds a predetermined threshold time duration, the source node executes a procedure for exchanging the master node.

The address field 14B of the header 14 is constructed of a destination address (DA) field 145 for indicating a cell destination node, source address (SA) field 146 for indicating a cell source node, and header check sequence (HCS) field 146 for use in detecting a header error. AH 15 serving as the header for the information field is constructed of a 2 bit segment type (ST) information 15A and reserved field 15B. The segment type information 15A indicates the position of the information block contained in the INFO field 16, within the segmented blocks of a transmission message. If the length of a transmission message is equal to or shorter than 60 bytes, it can be transmitted by using a single cell. If it is longer than 60 bytes, it is transmitted after being segmented into a plurality of information blocks on the 60 byte unit basis. For instance, if the information contained in the INFO field 16 is the first information block (FIRST) of a message segmented into multiple blocks, ST 15A is set to "10", "01" for the last information block (LAST), "00" for an intermediate information block (NEXT), and "11" for a single information block (SINGLE).

Figure 3:
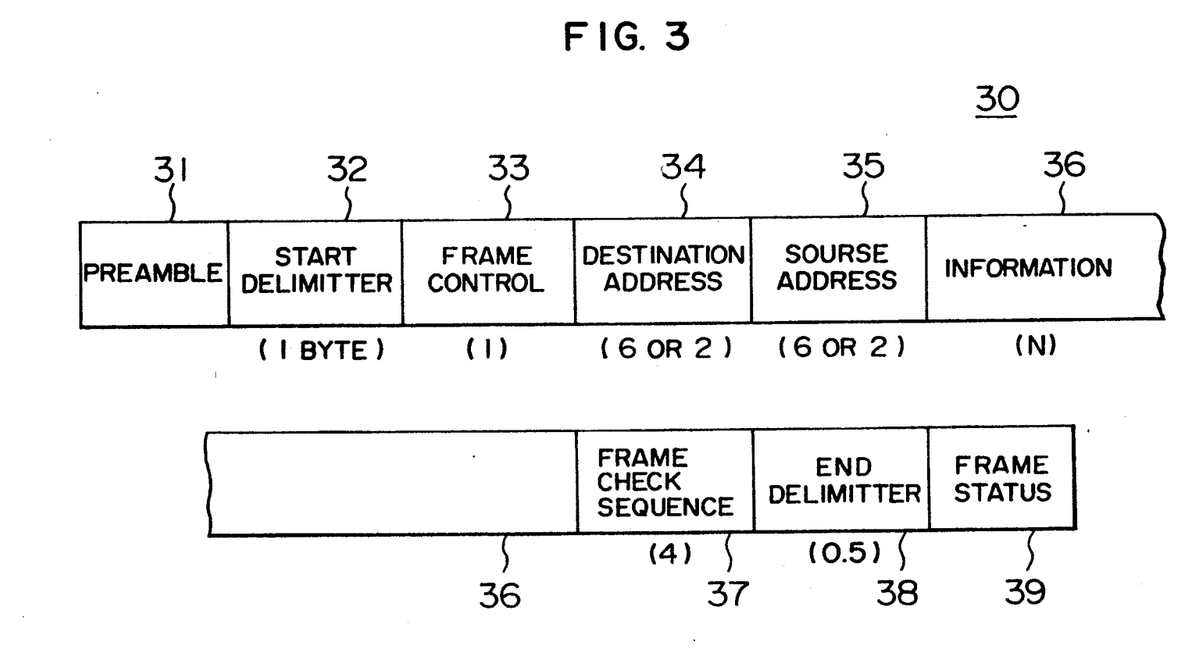
FIG. 3 illustrates an example of the format of a communication frame (message) on a sub-LAN of the network system shown in FIG. 1.

FIG. 3 shows an example of formats of a message frame 30 which is transmitted from a CPU 221 to 222 connected to the communication processor 220 or from a terminal station 211 to 216 connected to the sub-LAN 210. This message frame is in conformity with 802.5 stipulated by Committee of LAN Standardization of IEEE. The message frame is constructed of a pre-amble field 31, start delimitter (SD) field 32, frame control (FC) field 33, destination address (DA) field 34, source address (SA) field 35, information field 36, frame check sequence (FCS) field 37, end delimitter (ED) field 38, and frame status (FS) field 39.

In the message frame 30, the information to be sent to the main LAN 100 is stored in the area from FC field 33 to FCS field 37, the length thereof depending upon the information field 36 and generally taking a maximum of 4K bytes and about 200 bytes or so in average.

Referring to the network shown in FIG. 1, in operation of the nodes 200B and 200C accessible to host computers via communication processors 220 or the nodes 200D to 200F accessible to therminal stations 211 to 216 via sub-LANs 210D to 210F, if a message 30 received at a node from a sub-LAN or communication processor is directed to a sub-LAN or communication processor of another node, the message is temporarily buffered in a transmission frame buffer to be described later, to then segment it into information blocks of 60 byte unit. The information blocks each are added with the cell header 14, adaptation header 15 and ICS 17 and converted into a cell having a predetermined format. The formatted cells are packet multiplexed and sent to the main ring transmission line 100 by using non-use cell fields. On the other hand, the cell information in a SONET frame received from the transmission line 100 is checked from the destination node address DS 145 whether or not the cell is to be reassembled at the cell received node. If the cell is directed to the node concerned, the cell is buffered in the form corresponding to the source node address SA 146 contained in the cell. More in particular, if a plurality of source nodes have broadcast messages to a destination node, cells having different SA 146 are received at the destination node one after another. In view of this, each node buffers a received cell while checking the position of the received cell within segmented blocks of a message. After receiving all information blocks constituting one message, a message is reassembled and transferred to a sub-LAN or communication processor.

If the received message from a sub-LAN or communication processor is subject to the segmentation process in the order of message reception, a destination node can check the identity of a message of each received cell by using only the source address SA thereof, as described previously. However, if a source node causes in parallel two or more messages to be subject to the segmentation process, and sends cells of different messages to the main LAN, it is necessary in this case to add a specific ID (MID) for message discrimination in addition to SA 145. This MID is set in the reserved field 15B in the adaptation header AH so that the destination node can check the position of the received cell within segmented blocks of a message, on the basis of a combination of SA 146 and MID contained in the received cell.

In operation of the nodes 200A to 200C accessible to PBX, information transmission/reception to/from PBX is carried out by time division multiplexing while using cells with S bit="00" in a SONET frame. Setting "00" to S bit is carried out beforehand by the master node 200A for as many cells as required by the transmission bandwidth of inter-PBX communication. In the above manner, communications become possible by a SONET frame on the main LAN shared by both time division multiplexing and packet multiplexing.

Figure 4:
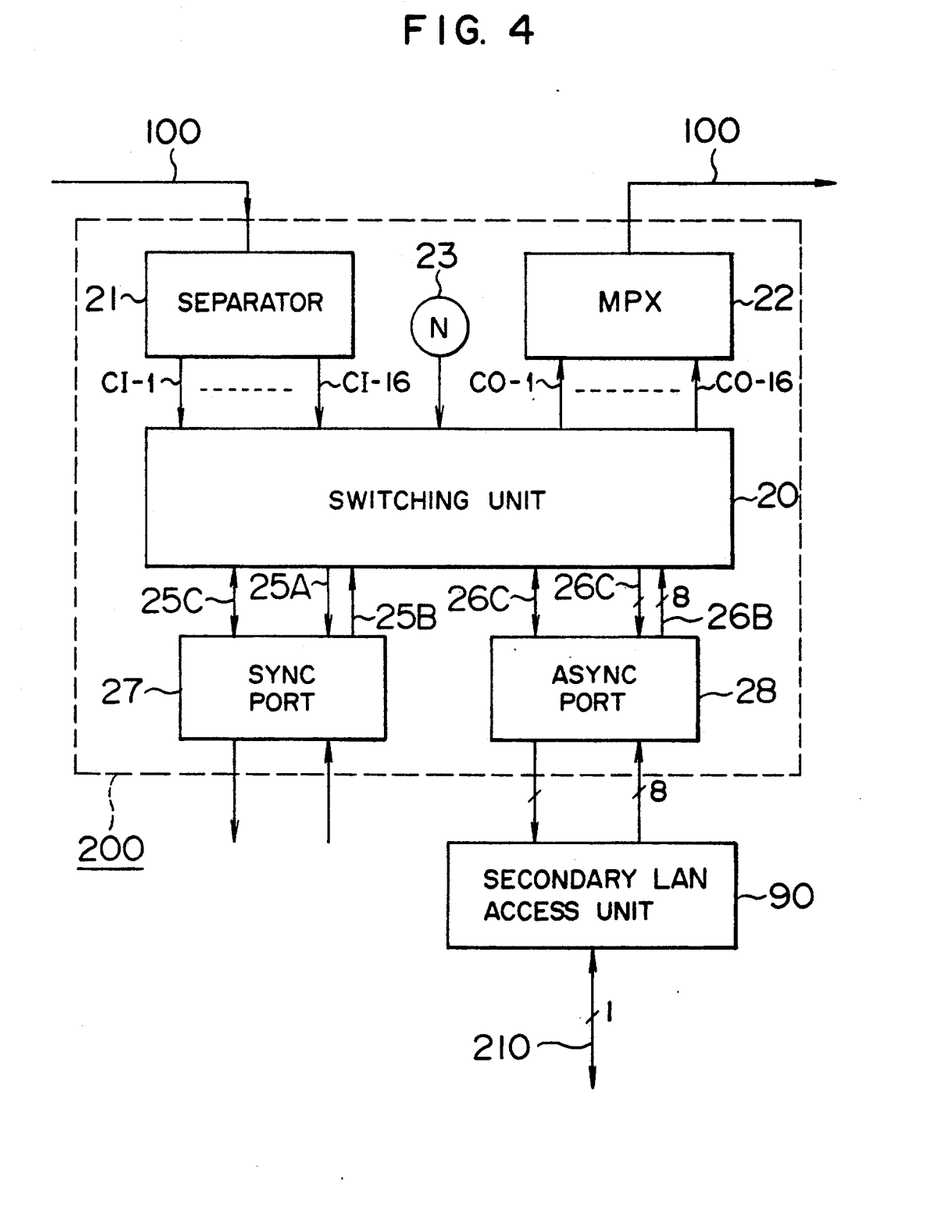
FIG. 4 shows an example of the structure of the node 200 shown in FIG. 1.

FIG. 4 shows an example of the structure of the node 200 provided with both functions of time division multiplex communication and packet multiplex communication, using a SONET frame. The node 200 is constructed of a separator unit 21, switching unit 20, multiplexer unit 22, synchronous port 27, asynchronous port 28, and pulse oscillator 35. The separator unit 21 separates a signal of 155.52×16 Mbps received from the main LAN transmission line 100 into sixteen channels, and sends cell information derived from a SONET frame reproduced from each channel to the switching unit 20 via signal lines CI-1 to CI-16. The multiplexer unit 22 reassembles the cell information received from the switching unit 20 via signal lines CO-1 to CO-16 into a SONET frame for each channel, and time-division multiplexes the sixteen SONET frame information in units of one byte to send it to the transmission line 100. The synchronous port 27 has a synchronous apparatus, typically PBX 230. The asynchronous port 28 has an asynchronous system, typically sub-LAN 210. The pulse oscillator 35 generates main clocks of 155.52 MHz±320 ppm.

The switching node 20 receives cells from signal lines CI-1 to CI-16, and sends time division multiplex cells (S="00") directed thereto to the synchronous port 27 via signal line 25A, packet multiplex cells (S="10") directed thereto to the asynchronous port 28 via signal line 26A, and other cells to the output signal lines CO-1 to CO-16 corresponding to the input signal lines CI-1 to CI-16. The switching unit 20 also receives synchronous information cells from the synchronous port 27 via signal line 25B or asynchronous information cells from the asynchronous port 28 via signal line 26B, and sends them to the output signal lines CO-1 to CO-16 corresponding to their destination nodes. References 25C and 26C represent signal lines for the control of data transmission/reception between the switching unit 20 and the ports 27 and 28, respectively, and reference 90 represents a sub- or secondary-LAN access interface unit connected to the asynchronous port 28.

The details of structure and operation of the node shown in FIG. 4 are described in the specification of U.S. Ser. No. 399,901 (Japanese Patent Application Nos. 63-218310 and 1-13910), so the detailed description will not be given herein.

Figure 5:
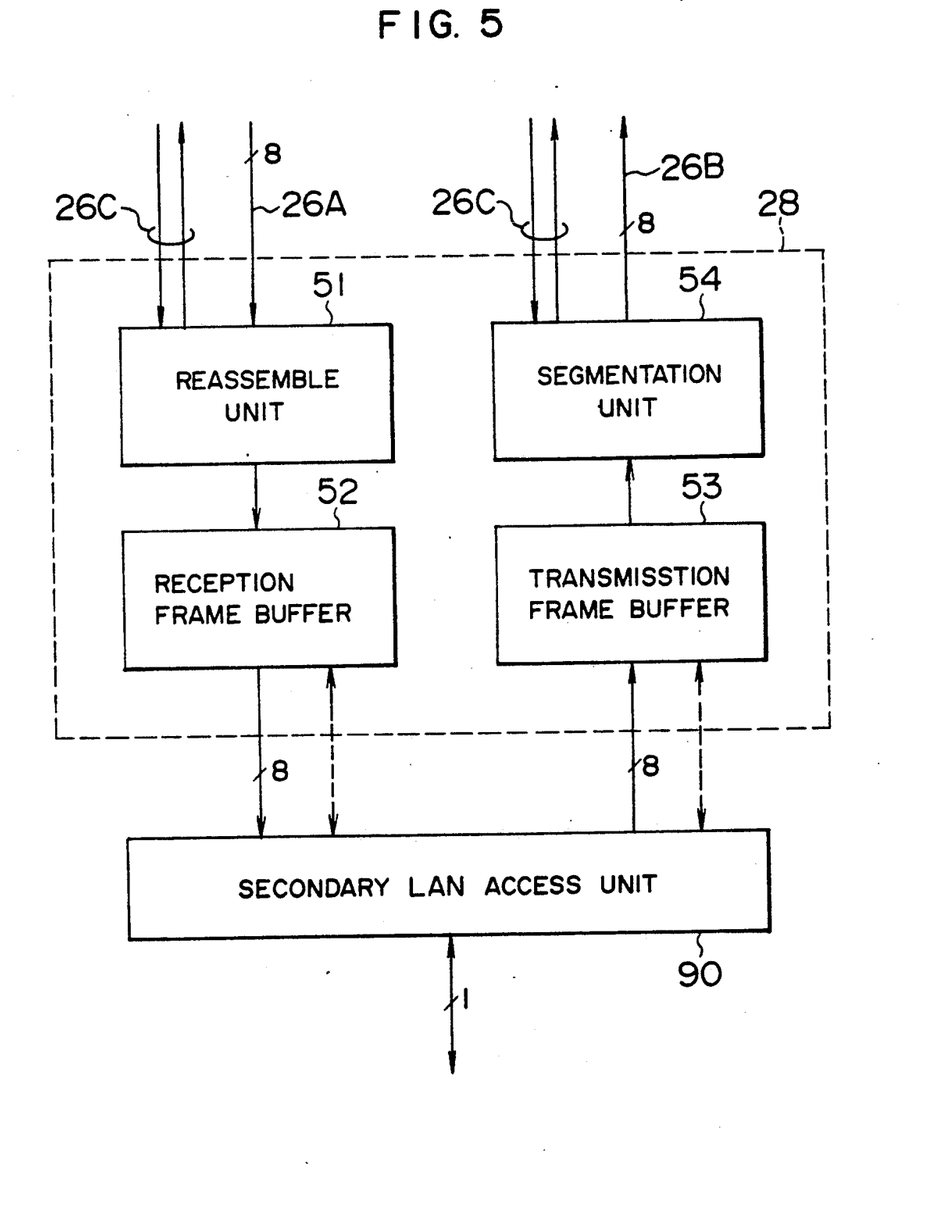
FIG. 5 shows an example of the structure of the asynchronous port 28 shown in FIG. 4.

FIG. 5 is a block diagram showing the structure of the asynchronous port 28. The asynchronous port 28 is constructed of a reassemble unit 51, reception frame buffer 52, transmission frame buffer 53, and segmentation unit 54. The reassemble unit 51 reassembles received cells from the switch units 20 via signal line 26A into a message. The reception frame buffer 52 temporarily stores the message received from the reassemble unit 51. The transmission frame buffer 53 temporarily stores a transmission frame received from the secondary LAN access unit 90. The segmentation unit 54 segments the transmission message sequentially taken from the transmission frame buffer into 60 byte units to form cells having the format shown in FIG. 2, and outputs them to signal line 26B.

Figure 6:
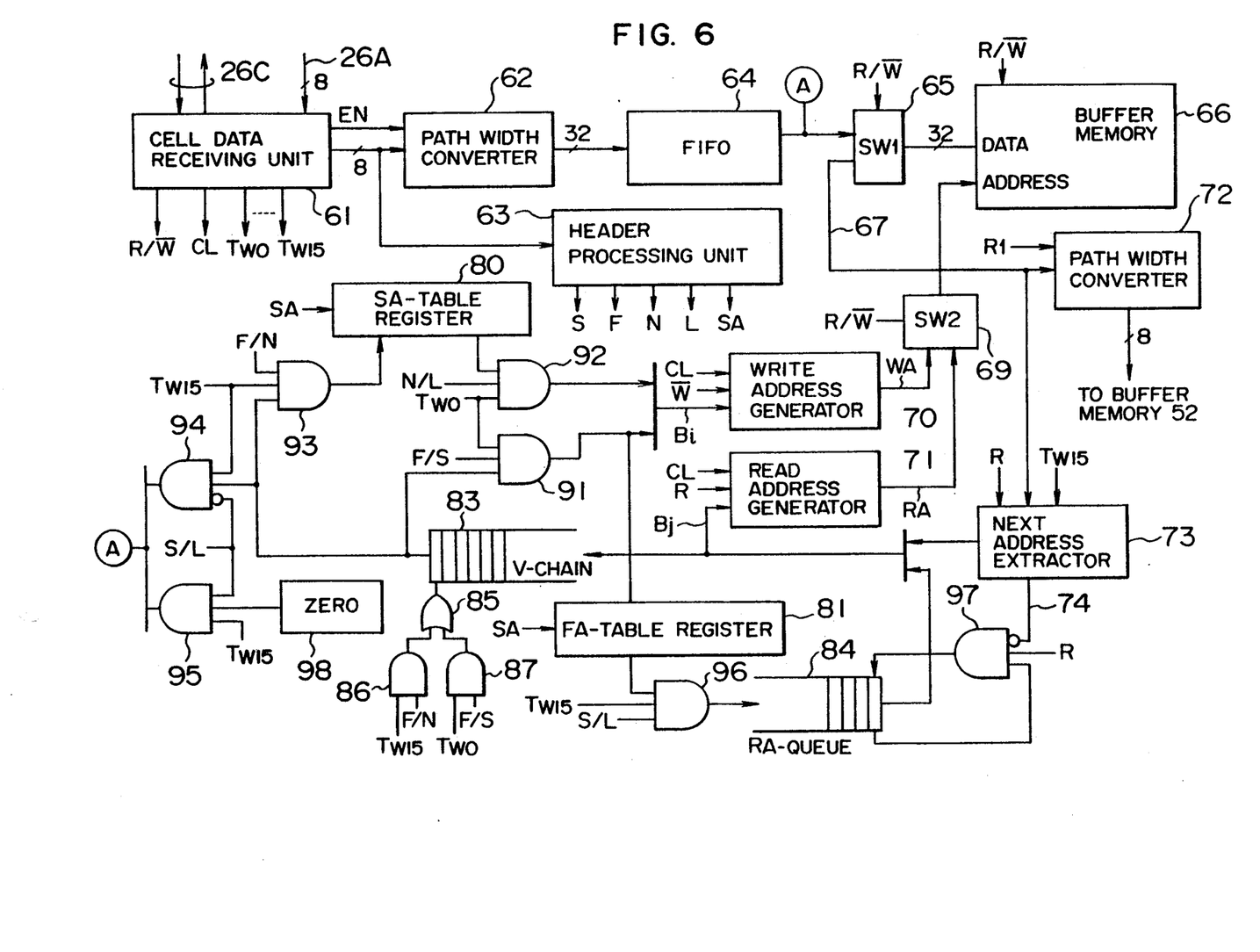
FIG. 6 shows an example of the structure of the reassemble unit 51 shown in FIG. 5 applying the present invention.

FIG. 6 shows an embodiment of the reassemble unit according to the present invention.

Cell data sent from the switching unit 20 in units of 8 bits are sequentially inputted to a cell data receiving unit 61 via signal line 26A, and thereafter inputted to a path width converter 62 and header processing unit 63. The cell data receiving unit 61 generates control signals R/W, CL, Tw0 to Tw15 and EN in synchronization with an input of cell data. The control signal EN takes a value "1" while the cell data constituting the INFO field 16 is supplied to the path width converter 62. The path width converter 62 picks up the 8 bit (1 byte) cell data supplied during the period in which the control signal En takes a value "1", and sends the cell data in units of 4 bytes (32 bits) to a first-in first-out (FIFO) buffer 64. The header processing unit 63 derives the SA field 146 and ST field 15A from the input cell data, and generates a source node address SA, and signals S (SINGLE), F (FIRST), N (NEXT), and L (LAST), respectively indicating the location of the information block.

The cell data stored in FIFO 64 are sequentially read during the read cycle (during R="1") of a buffer memory 66, and written therein via a switch which is controlled by signal R/W.

Figure 7A:
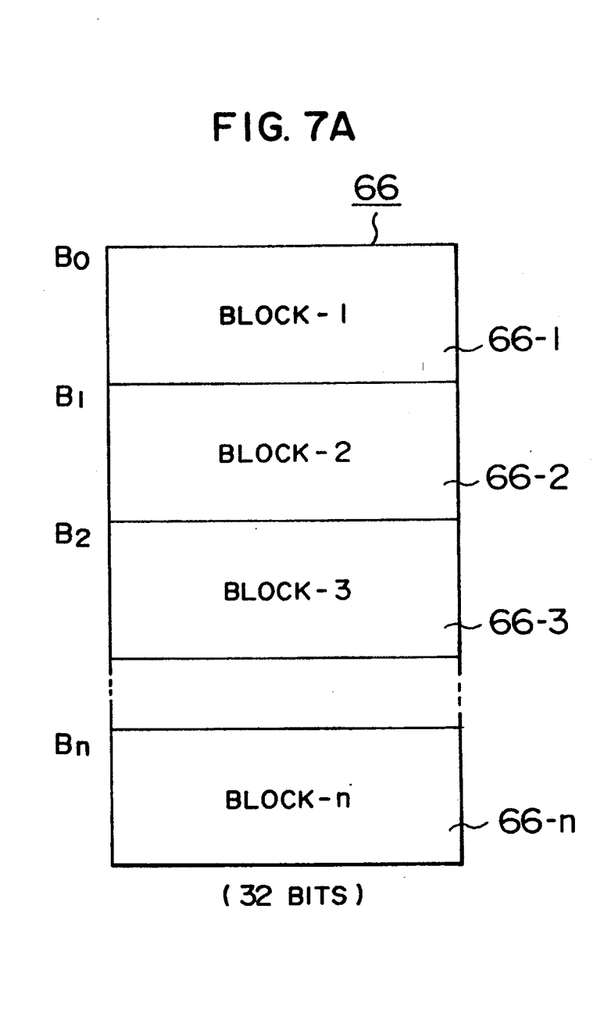
FIGS. 7A and 7B illustrate the addresses and memory contents of the buffer memory shown in FIG. 6.
Figure 7B:
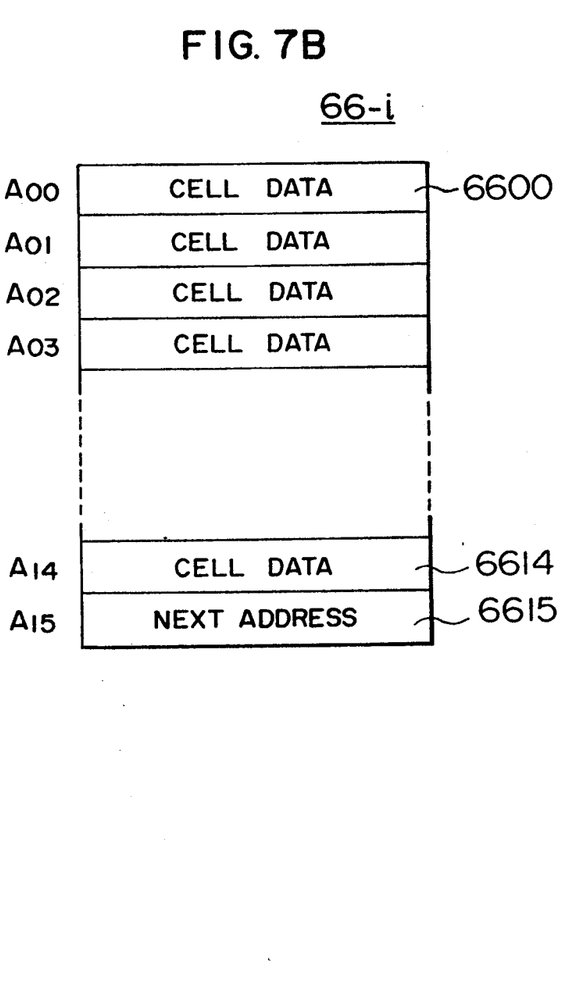

The buffer memory 66 is divided, e.g., as shown in FIG. 7A, into n blocks 66-1 to 66-n having a 32 bit width and designated by block addresses B0 to Bn. Each block is constructed of sixteen memory areas 6600 to 6615 each having intra-block address A00 to A15. The head intra-block address A00 designates the same memory area as that designated by a block address Bi.

The characteristic feature of this embodiment is as follows. Upon reception of a cell having the information block segmented from one message, a next address pointer (block address) is stored in the last memory area 6615 of a block of the buffer memory in which the received cell data are stored. The next address pointer indicates a vacant block, stored in which is the next received cell having the next information block segmented from the same message. A write address for the buffer memory 66 is supplied from a write address generator 70, and a read address from a read address generator 71. These addresses are selected by a switch 69 which is controlled by signal R/W.

In order to control the next address pointer for a given message, there are provided in this embodiment a register (SA-TABL resister) 80, register (FA-TABL register) 81, memory (V-CHAIN memory) 83, and memory (RA-QUEUE memory) 84. The register (SA-TABL register) 80 stores therein block addresses for next address pointers, correspondingly with source node addresses. The register (FA-TABL register) 81 stores therein block addresses storing first cells of messages, correspondingly with source node addresses. The memory (V-CHAIN memory) 83 stores therein vacant block addresses in the buffer memory 66. The memory (RA-QUEUE memory) 84 stores therein block addresses storing start cells of messages which are allowed to be read for the cell reassemble because all cell data have been completely stored in the buffer memory 66. The memories 83 and 84 store vacant addresses and read addresses, respectively, in a FIFO style.

The data write operation to the buffer memory 66 is conducted as in the following.

As the cell data constituting a single cell are supplied sequentially in units of 8 bits from the switching unit 20 to the reassemble unit 51, the cell data constituting the INFO field 16 are inputted to FIFO via the path width converter 62. The SA field 146 and ST field 15A of the received cell are decoded by the header processing unit 63 which then outputs control signals S, F, N or L in accordance with the location, within the message, of the information block including the INFO field of the received cell, and the source node address signal SA.

Figure 8:
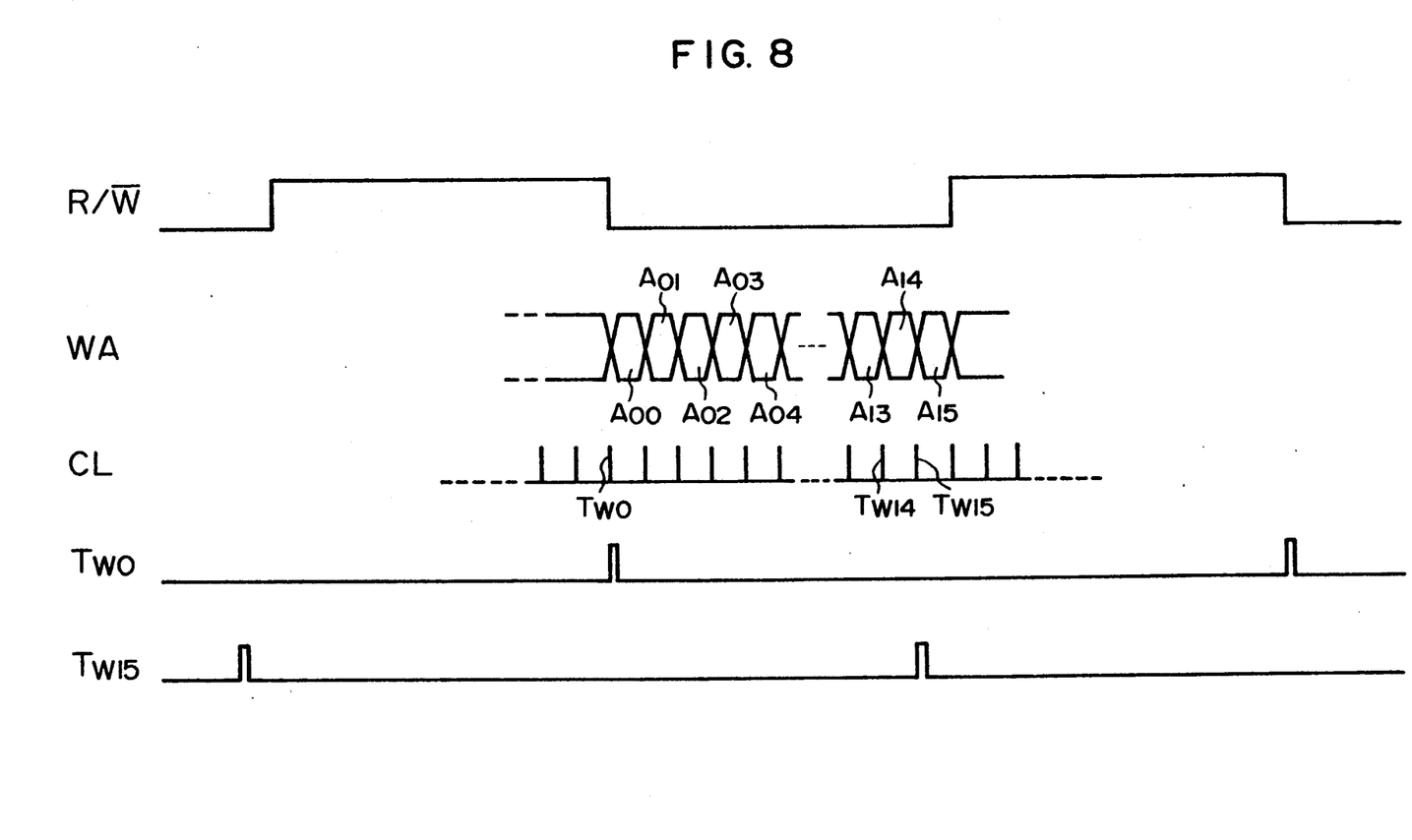
FIG. 8 shows outstanding control signals for the access to the buffer memory 66.

If a received cell is a cell containing a SINGLE or FIRST information block (hereinafter simply called SINGLE cell or FIRST cell), the control signal F or S becomes "1" and a vacant address Bi is read from V-CHAIN memory 83 at the timing of control pulse Tw0 first generated during the write cycle. Circuits constructed of gates 85 to 87 constitute a read control circuit for V-CHAIN memory. The vacant address Bi is inputted via an AND gate 91 to the write address generator 70, and stored in FA-TABLE register 81 at an entry corresponding to SA. Using the address Bi as an initial value, the write address generator 70 sequentially generates, in synchronization with clocks CL during the write cycle, the above-described intra-block addresses A00 to A15 which are used as the write addresses WA of the buffer memory 66. The relationship between the write addresses WA and control signals R/W. CL, and Tw0 is shown in FIG. 8.

If a received cell is a FIRST cell, a vacant address serving as a next address pointer is read from V-CHAIN memory 83 at the timing of pulse Tw15 in synchronization with generation of the intra-block address A15, and is stored in SA-TABLE register 80 via an AND gate 93 at an entry corresponding to SA. The next address pointer is supplied to the data input line of the buffer memory via an AND gate 94 and switch 65 and written in the last memory area of the block Bi. The same write operations of the next address pointer read from V-CHAIN memory 83 to the buffer memory 66 and to SA-TABLE register 80 are performed for the case where a received cell is a NEXT cell. Reading the next address pointer from V-CHAIN memory 83 is not executed if a received cell is a SINGLE cell or LAST cell which does not require a chain to the next cell. In this case, instead of reading the next address pointer, a zero address value generated by a zero address generator 98 is supplied via an AND gate 95 to the buffer memory 66 and written in the memory area at address A15. If a received cell is a SINGLE cell or a LAST cell, there is read an address representative of a write start location of cell data from FA-TABLE memory 81 at an entry corresponding to SA, at the timing of pulse Tw15. The read-out address is registered in RA-QUEUE memory 84.

If a received cell is a NEXT cell or a LAST cell, the address of a block for data write is already stored in SA-TABLE register 80. In this case, therefore, the next address pointer value read from SA-TABLE register 80 at the timing of pulse Tw0 is inputted as the block address Bi to the write address generator 70 to thereby sequentially generate intra-block addresses A00 to A15 whose initial value is the block address Bi.

Reading cell data from the buffer memory 66 is executed during the read cycle (during the period with R="1") in the following manner.

If all cell data of a reception message have been stored in the buffer memory, namely, if the data of a SINGLE cell or a LAST cell have already been stored in the buffer memory 66, the address Bj of the first cell data of the message has been already registered in RA-QUEUE memory. An AND gate 97 controls the read operation of RA-QUEUE memory. If during the read cycle the control signal 74 is "0" and the data (address Bi) are present in RA-QUEUE memory, the address Bj is read in the FIFO operation manner and inputted to the read address generator 71. The address Bj is also registered in V-CHAIN memory 83 for using it during the write operation of succeeding cell data.

Similar to the write address generator 70, using the block address Bj as the initial value, the read address generator 71 sequentially generates the intra-block addresses A00 to A15 which are the read addresses WA. Accordingly, during the read cycle, the contents of the memory areas of the buffer memory 66 designated by the addresses A00 to A15 are sequentially read out to a signal line 67 and supplied to a path width converter 72 and next address extractor 73. The path width converter 72 receives 32 bit cell data supplied during the period from Tw0 to Tw14 (determined by a signal R1), and sequentially outputs the 32 bit cell data in units of 8 bits to the reception frame buffer 52. The next address extractor 73 monitors the data outputted to the signal line 67 during the read cycle (R="1"). If the next address pointer value inputted at the timing of pulse Tw15 is not a zero address, it outputs to a signal line 74 a control signal for inhibiting to read the address Bj from RA-QUEUE memory 84, and outputs the next address pointer value to the read address generator 71 and V-CHAIN memory 83. With the above arrangement, the cell data are read during the next read cycle from the block identified by the next address pointer. During the read cycle for reading the memory block storing the last data (for SINGLE cell or LAST cell) of the same message, the next address pointer value is 0. In this case, since the next address extractor 73 outputs to the signal line 74 a signal for enabling the read operation of RA-QUEUE memory 84, during the next read cycle, the read operation of the cell data constituting the next message is repeated in accordance with a new block address Bj read from RA-QUEUE memory 84.

In this embodiment, in order to efficiently use the capacity of the buffer memory 66, only the INFO field 16 of the cell data is stored in the buffer memory. The cell header 14, adaptation header 15, or ICS 17 other than the INFO field may be temporarily stored in the buffer memory 66 such that unnecessary cell data are discarded upon reading them. Further in this embodiment, in order to discriminate the SINGLE cell and LAST cell from other cells (such as FIRST cell, NEXT cell) during the read cycle, a zero address is written in the next address pointer field of a memory block storing a SINGLE cell or LAST cell. Instead, the ST field 15A together with the INFO field in each received cell may be stored in the buffer memory 66, to thereby check during the read cycle from the value in the ST field whether or not the received cell is the last data block of a message.

Figure 9:
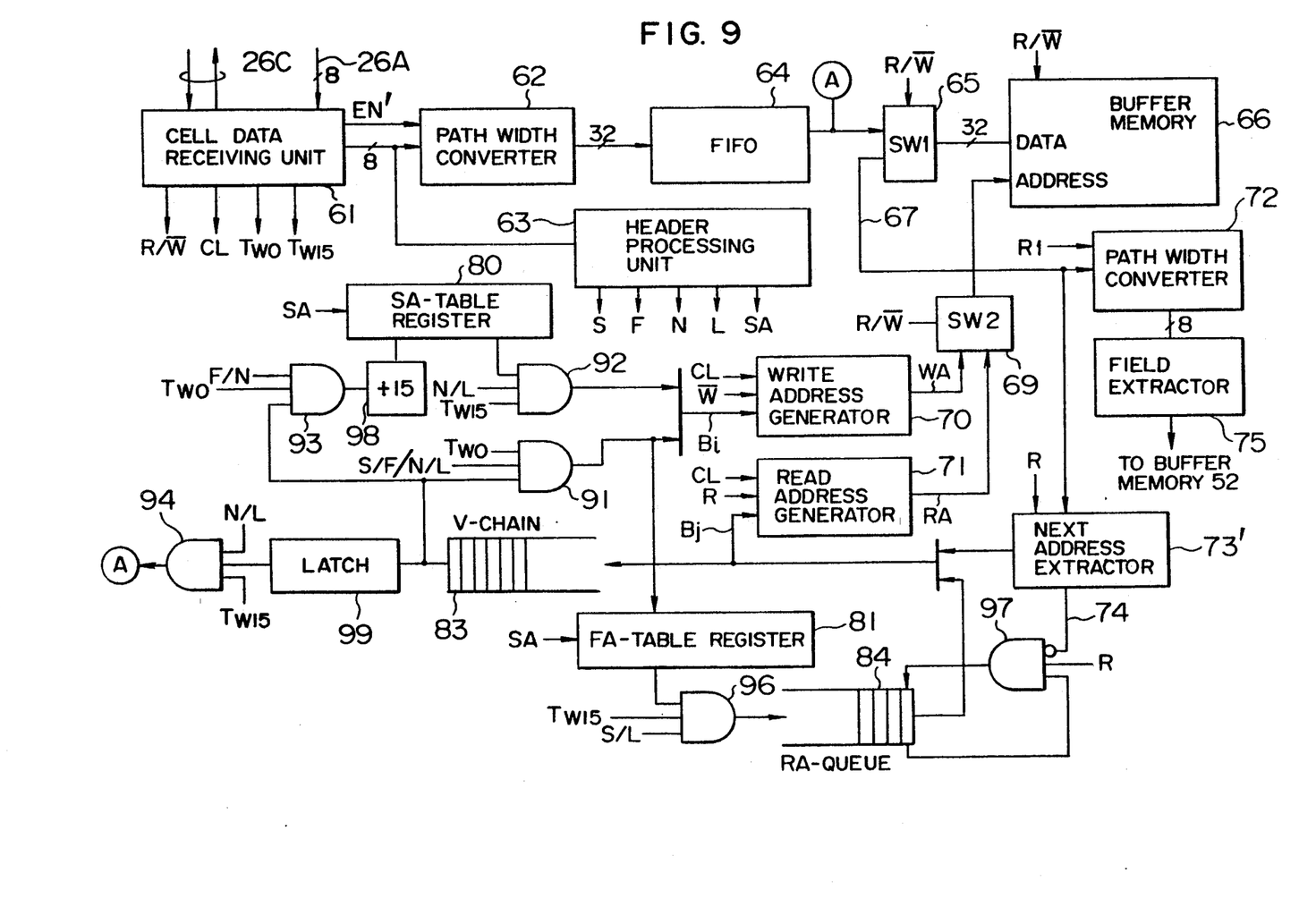
FIG. 9 shows another embodiment of the reassemble unit 51 applying the present invention.

FIG. 9 shows another embodiment of the reassemble unit 41 according to this invention.

In this embodiment, each time a cell is received, a vacant address Bi of the memory block for writing the cell data is read from V-CHAIN memory 83 and added as the next address pointer to the memory block of a preceding cell whose data have already been written in the buffer memory.

In this embodiment, when a FIRST cell or a SINGLE cell is received, only the cell data are written in a memory block without writing any data in its next address pointer field. As the address Bi of a memory block, a vacant address read from V-CHAIN memory 83 is used for all SINGLE, FIRST, NEXT, and LAST cells. If a received cell is a FIRST cell or a NEXT cell, when a succeeding NEXT or LAST cell is received, the block address of the succeeding cell is added as the next address pointer to the memory block of the preceding cell. In this embodiment, SA-TABLE register 80 is used for storing addresses of the buffer memory at which next address pointers are written in. Specifically, when a FIRST cell or a NEXT cell is received, the memory block address Bi read from V-CHAIN memory 83 is supplied to a constant value adder 98 via the AND gate 93. An output from the constant value adder 98 is an address (A15) of the next address pointer memory area in the memory block now concerned, which is stored in SA-TABLE resiter 80 at an entry corresponding to SA. The block address Bi itself may be stored in SA-TABLE register 80 and the address value read from the register 80 may be added to a constant value.

Similar to the embodiment described with FIG. 6, the write address WA of the buffer memory 66 is supplied from the write address generator 70. If a received cell is a NEXT cell or a LAST cell, the next address pointer is added to the memory block of a preceding cell. To this end, when the data of the present cell are completely written (at Tw15), the address (A15) of the preceding cell is read and supplied to the write address generator 70. The address Bi read from V-CHAIN memory 83 upon reception of the cell has been held in a latch 99. The address Bi held in the latch 99 is supplied via an AND gate 94 to the buffer memory 66 when the write address generator 70 outputs the address A15.

The ST code is used in this embodiment for identifying the last data block of a message during the cell data read cycle. Specifically, during the period while the data of AH field 15 and INFO field 16 are received by the cell data receiving unit 61, the control signal EN' is made "1" to allow the cell data in the AH field 15 including the ST code and in the INFO field 16 to be written in the buffer memory 66. In this case, the length of the INFO field 16 of each cell is set to 58 bytes shorter by the amount of the length (2 bytes) of the AH field than that of the first embodiment. With such an arrangement, generation of the intra-block addresses can be performed in the similar manner as the first embodiment, thereby using the memory space without any loss. If it is permitted that the block address is complicated or the memory area in each block is wasted more or less, the size of the INFO field of each cell may be set arbitrarily.

During the cell data read cycle (during the period with R = "1"), 32 bit data read from the buffer memory 66 to the signal line 67 are converted into 8 bit width data by the path width converter 72, and thereafter inputted to a field extractor 75. In the field extractor 75, the top two byte cell data (AH field) are removed and the following 58 byte cell data (INFO field) are sent to the reception frame buffer 52. In the meantime, the 32 bit data on the signal line 67 are also inputted to a next address extractor 73'. The next address extractor 73' turns on the signal line 74 if the ST code included in the data first inputted during the read cycle indicates the FIRST cell or NEXT cell, and turns it off if it indicates the SINGLE cell or LAST cell. The other functions of the next address extractor 73' are the same as the first embodiment.

As apparent from the foregoing description of the present invention, cell data are sequentially stored in vacant memory blocks of the buffer memory 66, each memory block stores therein a next address pointer indicating the address of a block in which the succeeding cell data of the same message are stored, there is stored in FA-TABLE the address of a block in which the first cell data of each message are stored, and after the last cell data of a message are stored in the buffer memory, there is stored in a read address queue (RA-QUEUE) the address of a memory block in which the first cell data of the message are stored. There are alternately provided a write cycle for writing data of one cell into the buffer memory and a read cycle for reading data of one cell from the buffer memory. In reading the cell data of a message, the cell data is read at the first read cycle in accordance with an address read from RA-QUEUE, and at the succeeding cycles the cell data are read in accordance with the next address pointer read from the buffer memory at each preceding read cycle. The address indicating a memory block from which the cell data have been read is used as a vacant memory block address so that this block is released for writing cell data to be received thereafter.

Accordingly, the present invention allows to use a memory block whose read operation has completed, at the next write cycle. If the memory buffer capacity is designed as (number of memory blocks required for a maximum length message) × (number of source nodes), a message can be reassembled without discarding reception cells because of insufficient memory areas.

Further, if the buffer memory capacity is designed to have a larger capacity than the above value, it is possible to read cell data from the buffer memory 66 in response to a read request from the sub-LAN access unit 90 so that the capacity of the reception frame buffer 52 may be made small.

We claim:

1. A communication apparatus for receiving a plurality of fixed length packets transmitted from a plurality of transmission source apparatus, and reassembling a communication message from a plurality of packets having the same transmission source address, each packet having a header field including a transmission source address and a message information field including an information block obtained by segmenting a message, comprising:

- a buffer memory divided into a plurality of memory blocks for storing packet data;
- first memory means for storing addresses each indicating a vacant memory block within said buffer memory;
- second memory means for storing next address pointers correspondingly with each transmission source address, each next address pointer indicating a memory block in which the data of a packet to be received next are stored;
- third memory means for storing addresses correspondingly with each transmission source address, each address indicating a memory block in which the packet data including the first information block of a message are stored;
- fourth memory means for storing addresses correspondingly with each transmission source address, each address indicating a memory block stored in which are the packet data including the first information block of a message allowed to be reassembled;
- write control means which operates such that when there is received a packet including the first information block of a message transmitted upon segmentation into a plurality of information blocks, an address read from said first memory means is stored in said third memory means, the data of said received packet are stored in a vacant memory block indicated by said address, and another address read from said first memory means is stored in said second memory means and in said memory block storing said packet data; and
- that when there is received a packet including one of the second and following information blocks of said message, the data of said received packet are stored in a memory block indicated by an address read from said second memory means, if said received packet does not include the last information block of said message, an address read from said first memory means is stored in said second memory means and in said memory block storing the data of said received packet, and if said received packet includes the last information block of said message, an address read from said third memory means is stored in said fourth memory means; and
- read control means which operates such that the first information block of a message is read from the memory block indicated by an address read from said fourth memory means, and the second and following information blocks of said message are sequentially read in accordance with next address pointers read from respective memory blocks.

2. A communication apparatus according to claim 1, wherein said write and read control means alternately access said buffer memory at a predetermined operation cycle, and the packet data of one memory block are processed at each operation cycle.

3. A communication apparatus according to claim 1, further comprising means for extracting said message information field from each received packet, whereby the contents of said message information field are stored as said packet data in each memory block of said buffer memory.

4. A communication apparatus according to claim 1, wherein said write control means includes means for storing, when a received packet includes all information of a message, an address read from said first memory means directly, or via said third memory, in said fourth memory means, and storing the data of said received packet in a memory block indicated by said address.

5. A communication apparatus for receiving a plurality of fixed length packets transmitted from a plurality of transmission source apparatus, and reassembling a communication message from a plurality of packets having the same transmission source address, each packet having a header field including a transmission source address, a message information field including an information block obtained by segmenting a message and a code field for indicating the position of an information block within a message, comprising:

- a buffer memory divided into a plurality of memory blocks for storing packet data;
- first memory means for storing addresses each indicating a vacant memory block within said buffer memory;
- second memory means for storing addresses correspondingly with each transmission source address, each address indicating a memory block storing the data of a preceding packet;
- third memory means for storing addresses correspondingly with each transmission source address, each address indicating a memory block in which the packet data including the first information block of a message are stored;
- fourth memory means for storing addresses correspondingly with each transmission source address, each address indicating a memory block stored in which are the packet data including the first information block of a message allowed to be reassembled;
- write control means which operates such that when there is received a packet including the first information block of a message transmitted upon segmentation into a plurality of information blocks, an address read from said first memory means is stored in said second and third memory means, and the data of said received packet are stored in a vacant memory block indicated by said address; and
- that when there is received a packet including one of the second and following information blocks of said message, the data of said received packet are stored in a ,memory block indicated by an address read from said first memory means, and said address is stored as a next address pointer in a memory block at a predetermined memory area indicated by an address read from said second means, and if said received packet includes the last information block of said message, an address read from said third memory means is stored in said fourth memory means; and
- read control means which operates such that the first information block of a message is read from the memory block indicated by an address read from said fourth memory means, and the second and following information blocks of said message are sequentially read in accordance with next address pointers read from respective memory blocks.

6. A communication apparatus according to claim 5, wherein said write control means includes means for adding a constant value to an address read from said first memory means, whereby when there is received a packet including the first information block of a message, an address outputted from said adding means is stored in said second memory, and when there is received one of the second and following information blocks of said message, said address as a next address pointer is stored in said buffer memory at the location indicated by an address read from said second memory means.

7. A communication apparatus according to claim 5, wherein said write and read control means alternately access said buffer memory at a predetermined operation cycle, and the packet data of one memory block are processed at each operation cycle.

8. A communication apparatus according to claim 5, wherein each memory block stores at least the contents of said message information field and position code field included in a received packet, and said read control means discriminates the last information block of a message in accordance with said position code read from each memory block.

* * * * *